US010818250B2

(12) United States Patent
Staton et al.

(10) Patent No.: US 10,818,250 B2
(45) Date of Patent: Oct. 27, 2020

(54) METHODS OF ALTERING A FIELD OF VIEW

(71) Applicant: NEWTONOID TECHNOLOGIES, L.L.C., Liberty, MO (US)

(72) Inventors: Fielding B. Staton, Liberty, MO (US); David Strumpf, Columbia, MO (US)

(73) Assignee: NEWTONOID TECHNOLOGIES, L.L.C., Liberty, MO (US)

( * ) Notice: Subject to any disclaimer, the term of this patent is extended or adjusted under 35 U.S.C. 154(b) by 0 days.

(21) Appl. No.: 16/291,532

(22) Filed: Mar. 4, 2019

(65) Prior Publication Data

US 2019/0197970 A1 Jun. 27, 2019

Related U.S. Application Data

(63) Continuation of application No. 15/853,079, filed on Dec. 22, 2017, now Pat. No. 10,223,985.
(Continued)

(51) Int. Cl.
*G09G 3/36* (2006.01)
*G09G 3/20* (2006.01)
(Continued)

(52) U.S. Cl.
CPC ............ *G09G 3/36* (2013.01); *A61G 11/00* (2013.01); *B64C 1/1484* (2013.01);
(Continued)

(58) Field of Classification Search
CPC .. A61G 11/00; A61G 2203/20; B64C 1/1484; E06B 2009/2417; E06B 2009/2464;
(Continued)

(56) References Cited

U.S. PATENT DOCUMENTS 1,383,582 A 7/1921 Stubbs
2,950,576 A 8/1960 Rubenstein
(Continued)

FOREIGN PATENT DOCUMENTS

KR 20090115315 A 11/2009

OTHER PUBLICATIONS

English translation of KR Office Action received in KR App. No. 10-2019-7017473, dated Aug. 28, 2019.
(Continued)

*Primary Examiner* — Chun-Nan Lin
(74) *Attorney, Agent, or Firm* — Avant Law Group, LLC

(57) ABSTRACT

A multi-layered intelligent display system includes a first LCD display panel; a second OLED display panel; a smart panel disposed behind the second display panel; an LED panel disposed between the second display panel and the smart panel; a sensor for detecting the ambient light behind the smart panel and activating the LED panel if the ambient light is below a predetermined illuminance; a memory having programming instructions stored thereon; and a controller in communication with the first and second display panels, the smart panel, and the memory. The multi-layered intelligent glass display is operable in each of a display mode, a multilayer display mode, and a transparent mode.

8 Claims, 7 Drawing Sheets

Related U.S. Application Data

(60) Provisional application No. 62/450,769, filed on Jan. 26, 2017, provisional application No. 62/438,989, filed on Dec. 23, 2016.

(51) Int. Cl.
| | | |
|---|---|---|
| *G02F 1/1347* | (2006.01) | |
| *B64D 11/00* | (2006.01) | |
| *A61G 11/00* | (2006.01) | |
| *B64C 1/14* | (2006.01) | |
| *E06B 9/24* | (2006.01) | |
| *G02F 1/133* | (2006.01) | |
| *G02F 1/1333* | (2006.01) | |
| *G02F 1/137* | (2006.01) | |
| *G09G 3/32* | (2016.01) | |
| *G06F 3/14* | (2006.01) | |
| *G09G 3/3208* | (2016.01) | |

(52) U.S. Cl.
CPC ............ *B64D 11/0015* (2013.01); *E06B 9/24* (2013.01); *G02F 1/137* (2013.01); *G02F 1/1347* (2013.01); *G02F 1/13318* (2013.01); *G02F 1/13338* (2013.01); *G02F 1/133308* (2013.01); *G09G 3/20* (2013.01); *G09G 3/32* (2013.01); *A61G 2203/20* (2013.01); *B64D 2011/0038* (2013.01); *B64D 2011/0061* (2013.01); *E06B 2009/2417* (2013.01); *E06B 2009/2464* (2013.01); *G02F 2001/13312* (2013.01); *G02F 2001/133314* (2013.01); *G02F 2201/44* (2013.01); *G02F 2201/58* (2013.01); *G02F 2203/01* (2013.01); *G06F 3/1431* (2013.01); *G09G 3/3208* (2013.01); *G09G 3/3611* (2013.01); *G09G 2300/023* (2013.01); *G09G 2360/144* (2013.01); *G09G 2380/12* (2013.01)

(58) Field of Classification Search
CPC .. E06B 9/24; G02F 1/13318; G02F 1/133308; G02F 1/13338; G02F 1/1347; G02F 1/137; G02F 2001/13312; G02F 2001/133314; G02F 2201/44; G02F 2201/58; G02F 2203/01; G06F 3/1431; G09G 2300/023; G09G 2360/144; G09G 2380/12; G09G 3/20; G09G 3/32; G09G 3/3208; G09G 3/36; G09G 3/3611
See application file for complete search history.

(56) References Cited

U.S. PATENT DOCUMENTS

| | | | |
|---|---|---|---|
| 3,467,973 | A | 9/1969 | Minnick |
| 3,783,568 | A | 1/1974 | Adler et al. |
| 4,350,978 | A | 9/1982 | Riccobono |
| 4,690,960 | A | 9/1987 | Yamauchi et al. |
| 4,860,851 | A | 8/1989 | Krevor et al. |
| 5,348,363 | A | 9/1994 | Fink |
| 5,902,656 | A | 5/1999 | Hwang |
| 5,946,866 | A | 9/1999 | Weglewski et al. |
| 7,241,017 | B2 | 7/2007 | Ariyoshi |
| 7,426,804 | B2 | 9/2008 | Pylkki et al. |
| 7,461,726 | B2 | 12/2008 | Hawkins et al. |
| 8,303,027 | B2 | 11/2012 | Murakami et al. |
| 8,695,955 | B1 | 4/2014 | Staton |
| 8,789,818 | B1 | 7/2014 | Staton |
| 8,899,562 | B1 | 12/2014 | Staton |
| 8,938,818 | B2 | 1/2015 | Ide et al. |
| 9,042,019 | B2 * | 5/2015 | Su .......... G02B 1/115 359/581 |
| 9,061,542 | B1 | 6/2015 | Huang |
| 9,341,527 | B2 | 5/2016 | O'Bier, II et al. |
| 9,371,669 | B2 | 6/2016 | Berg et al. |
| 9,476,478 | B2 | 10/2016 | Staton |
| 9,759,286 | B1 | 9/2017 | Staton et al. |
| 9,785,250 | B1 * | 10/2017 | Staton ............ G06F 3/0304 |
| 9,845,838 | B2 | 12/2017 | Staton |
| 2004/0012502 | A1 | 1/2004 | Rasmussen |
| 2004/0232240 | A1 * | 11/2004 | O'Keeffe ............ G09G 3/002 235/462.14 |
| 2006/0155036 | A1 | 7/2006 | Ackermans |
| 2007/0138583 | A1 | 6/2007 | Ofek et al. |
| 2008/0042012 | A1 | 2/2008 | Callahan et al. |
| 2008/0085405 | A1 | 4/2008 | Prenzel et al. |
| 2008/0097143 | A1 * | 4/2008 | Califorrniaa ............ A01N 1/02 600/22 |
| 2008/0136741 | A1 * | 6/2008 | Williams ............... G07F 17/32 345/3.3 |
| 2008/0139722 | A1 | 6/2008 | Shefelbine et al. |
| 2009/0050428 | A1 | 2/2009 | Kloucek et al. |
| 2009/0326140 | A1 | 12/2009 | Shimada et al. |
| 2010/0089772 | A1 * | 4/2010 | Deshusses ........... G01N 27/127 205/781 |
| 2010/0097293 | A1 | 4/2010 | McMahon |
| 2010/0108306 | A1 | 5/2010 | Cooper |
| 2010/0188315 | A1 | 7/2010 | Baik |
| 2010/0214634 | A1 | 8/2010 | Kroll et al. |
| 2010/0253671 | A1 * | 10/2010 | Perry .................... G06F 1/1633 345/212 |
| 2011/0051775 | A1 | 3/2011 | Ivanov et al. |
| 2011/0171137 | A1 | 7/2011 | Patolsky et al. |
| 2012/0068913 | A1 | 3/2012 | Bar-Zeev |
| 2012/0098941 | A1 | 4/2012 | Joseph et al. |
| 2012/0169950 | A1 | 7/2012 | Tatzel et al. |
| 2013/0194167 | A1 | 8/2013 | Yun et al. |
| 2013/0342428 | A1 * | 12/2013 | Liu ....................... G09G 3/2092 345/4 |
| 2014/0285023 | A1 * | 9/2014 | Garg ......................... G05F 1/67 307/82 |
| 2015/0071655 | A1 | 3/2015 | Tatzel et al. |
| 2015/0073204 | A1 | 3/2015 | Rapoport |
| 2015/0294603 | A1 * | 10/2015 | Braunstein ............ G09G 3/004 315/86 |
| 2016/0040743 | A1 | 2/2016 | Staton |
| 2016/0091650 | A1 | 3/2016 | Uchiumi et al. |
| 2016/0162242 | A1 | 6/2016 | Xiong |
| 2016/0223878 | A1 | 8/2016 | Tran et al. |
| 2016/0343315 | A1 | 11/2016 | Richards et al. |
| 2016/0363727 | A1 | 12/2016 | Suntsova et al. |
| 2017/0200252 | A1 | 7/2017 | Nguyen |
| 2017/0261746 | A1 | 9/2017 | Tam |

OTHER PUBLICATIONS

PCT Application No. PCT/US2017/068300, International Preliminary Report on Patentability, dated Jul. 4, 2019, 11 pages.
Canadian Application No. 3044073, Office Action, dated Jul. 2, 2019, 4 pages.
PCT Application No. PCT/US2017/068300, International Search Report and Written Opinion, dated Feb. 23, 2018, 12 pages.
European Search Report issued by European Patent Office (EPO) dated Jun. 2, 2020 regarding European application No. 17883156.6, Munich, Germany.

* cited by examiner

METHODS OF ALTERING A FIELD OF VIEW

CROSS-REFERENCE TO RELATED APPLICATIONS

This application is a continuation of U.S. application Ser. No. 15/853,079, filed Dec. 22, 2017, which claims priority to U.S. Provisional Patent Application No. 62/438,989, filed Dec. 23, 2016 and U.S. Provisional Patent Application No. 62/450,769, filed Jan. 26, 2017, the disclosures of which are incorporated herein by reference in their entireties.

FIELD OF THE DISCLOSURE

The disclosure relates generally to the field of electronic displays. More specifically, the disclosure relates to multi-layered electronic displays employing display technology, such as LED LCD display technology, OLED display technology, and/or another display technology, in addition to smart glass technology.

SUMMARY

The following presents a simplified summary of the invention in order to provide a basic understanding of some aspects of the invention. This summary is not an extensive overview of the invention. It is not intended to identify the critical elements of the invention or to delineate the scope of the invention. Its sole purpose is to present some concepts of the invention in a simplified form as a prelude to the more detailed description that is presented herein.

In one embodiment of the invention, a multi-layered intelligent glass display system includes a display panel; a smart glass panel disposed behind the display panel; a memory having programming instructions stored thereon; and a controller in communication with the display panel, the smart glass panel, and the memory. The multi-layered intelligent glass display is operable in each of a display mode, a multilayer display mode, and a transparent mode.

In another embodiment, a multi-layered intelligent display system, includes a first layer comprising a display; a second layer comprising a smart layer disposed behind the first layer, the smart layer being selectively opaque; a memory having programming instructions stored thereon; and a controller in communication with the first layer, the second layer, and the memory. The multi-layered intelligent display is operable in each of a display mode, a multilayer display mode, and a transparent mode.

In still another embodiment, a multi-layered intelligent display system includes a first LCD display panel; a second OLED display panel; a smart panel disposed behind the second display panel; an LED panel disposed between the second display panel and the smart panel; a sensor for detecting the ambient light behind the smart panel and activating the LED panel if the ambient light is below a predetermined illuminance; a memory having programming instructions stored thereon; and a controller in communication with the first and second display panels, the smart panel, and the memory. The multi-layered intelligent glass display is operable in each of a display mode, a multilayer display mode, and a transparent mode.

BRIEF DESCRIPTION OF THE SEVERAL VIEWS OF THE DRAWINGS

Illustrative embodiments of the present invention are described in detail below with reference to the attached drawing figures and wherein.

DETAILED DESCRIPTION

Smart glass is known in the art. LCD displays have also been known for many decades. The present disclosure relates in general to a multi-layered composite display that, in an embodiment, utilizes both smart glass and LCD display and/or other display technologies. For example, display technologies may employ hybrid embodiment combinations of transmissive, reflective, single-beam, multi-beam, holographic, and/or particle resonant mode particle displays (e.g. 3-D nano particles such as Carbon Nanotube [CNT] vibrational RGB/A emission resonance, etc.).

Smart glass, also referred to in the industry as privacy glass, switchable glass, intelligent glass, electric glass, etc., can change its tint or shade upon the application of a stimulus. While smart glass can be made using many different types of technologies, suspended particle devices are currently the most popular type of smart glass. The present disclosure, however, encompasses smart glass manufactured using any technology, whether now known or subsequently developed. As is described in greater detail herein, smart glass particles can be electrically excited to selectively appear transparent while becoming diffused when the excitation voltage is removed. Areas of a plane can be energized as a contiguous array of particles and controlled as a single panel of smart glass with a single AC voltage control signal excitation. Multiple areas or segments can be seamlessly isolated to create a plurality of segment array elements allowing patterns of bars, blocks, or discrete segments. A control grid or matrix of control signals can be configured as multiplexed rows and columns on opposing sides of the particle pane(s) to provide individualized control of the smart particle arrays. The multiplexed excitation control signals can be driven with strategically stepped waveform voltage levels over time in order to provide a differential signal to each particle segment area.

Figure 1A:
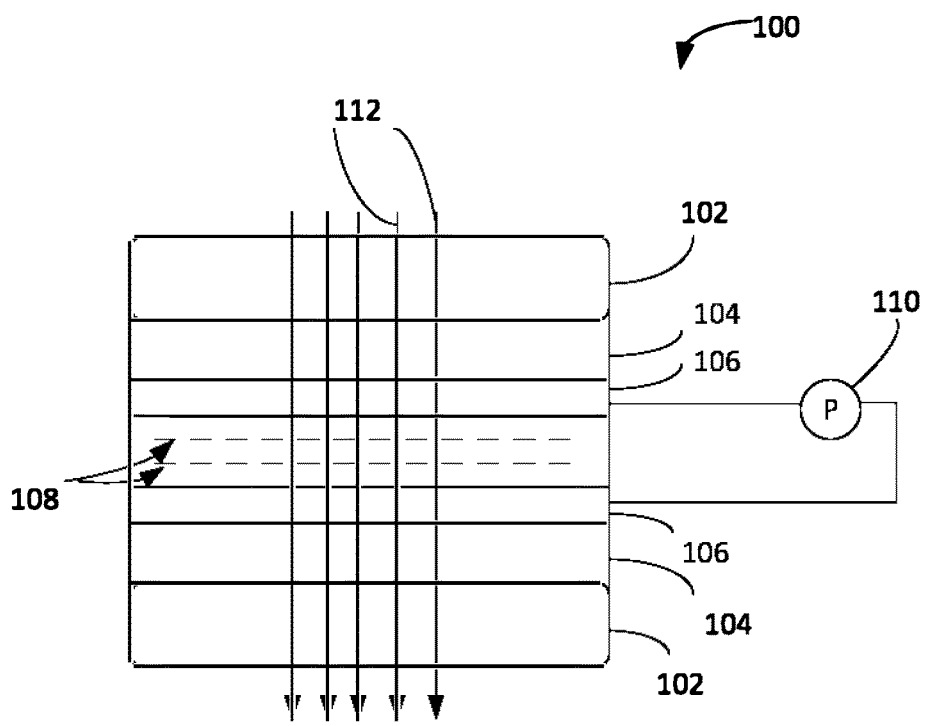
FIGS. 1A-1B are schematics illustrating the workings of a PRIOR ART smart glass panel.
Figure 1B:
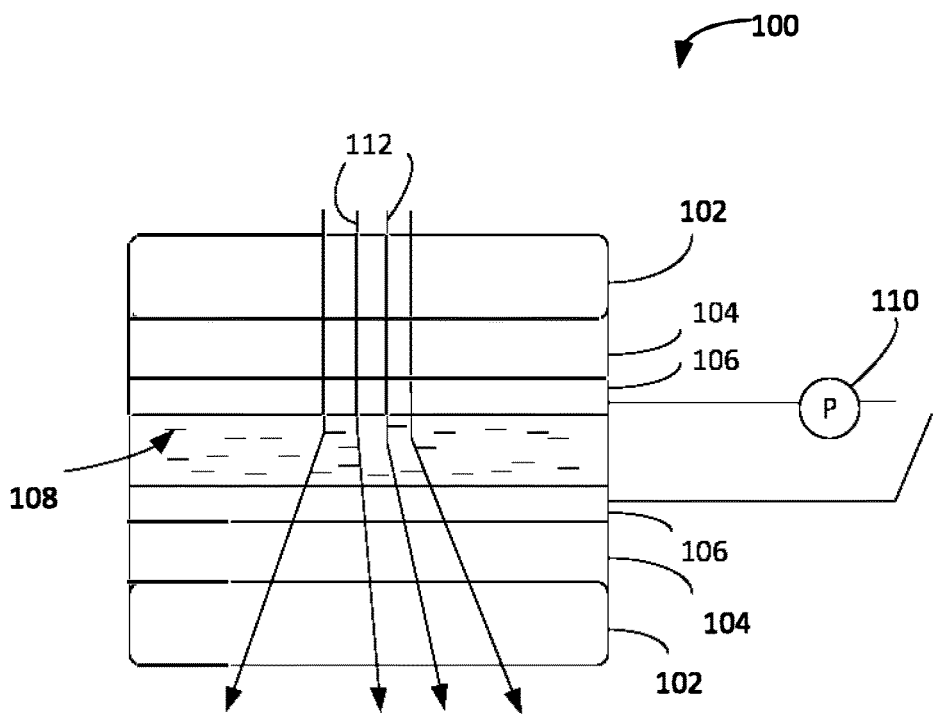

FIG. 1A schematically illustrates a suspended particle smart glass panel 100 as is known in the art. The panel 100 may include a glass layer 102, a polyethylene terephthalate (or PET) film 104, and a polymer layer 106 encasing crystalline particles (e.g., liquid crystal molecules) 108 in a carrier fluid. When an electric current is passed through the polymer layer 106 (e.g., via power source 110), as shown in FIG. 1A, the liquid crystal molecules 108 align in a substantially uniform pattern, thereby allowing light 112 to uniformly pass therethrough (which allows the panel 100 to be transparent or generally transparent). When the power source 110 is switched off (or otherwise disconnected, as shown in FIG. 1B), the liquid crystal molecules 108 orient randomly and diffuse or scatter the light 112, causing the glass panel 100 to become opaque (or generally opaque). Those of skill in the art shall understand that the opposite may also be true. In other words, when the power source 110 is switched off, the liquid crystal molecules 108 may be aligned in a substantially uniform pattern, thereby allowing light 112 to uniformly pass therethrough. And when the power source 110 is switched on such that electric current passes through the polymer layer 106, the liquid crystal molecules 108 may randomly orient, to diffuse or scatter the light 112.

Figure 2:
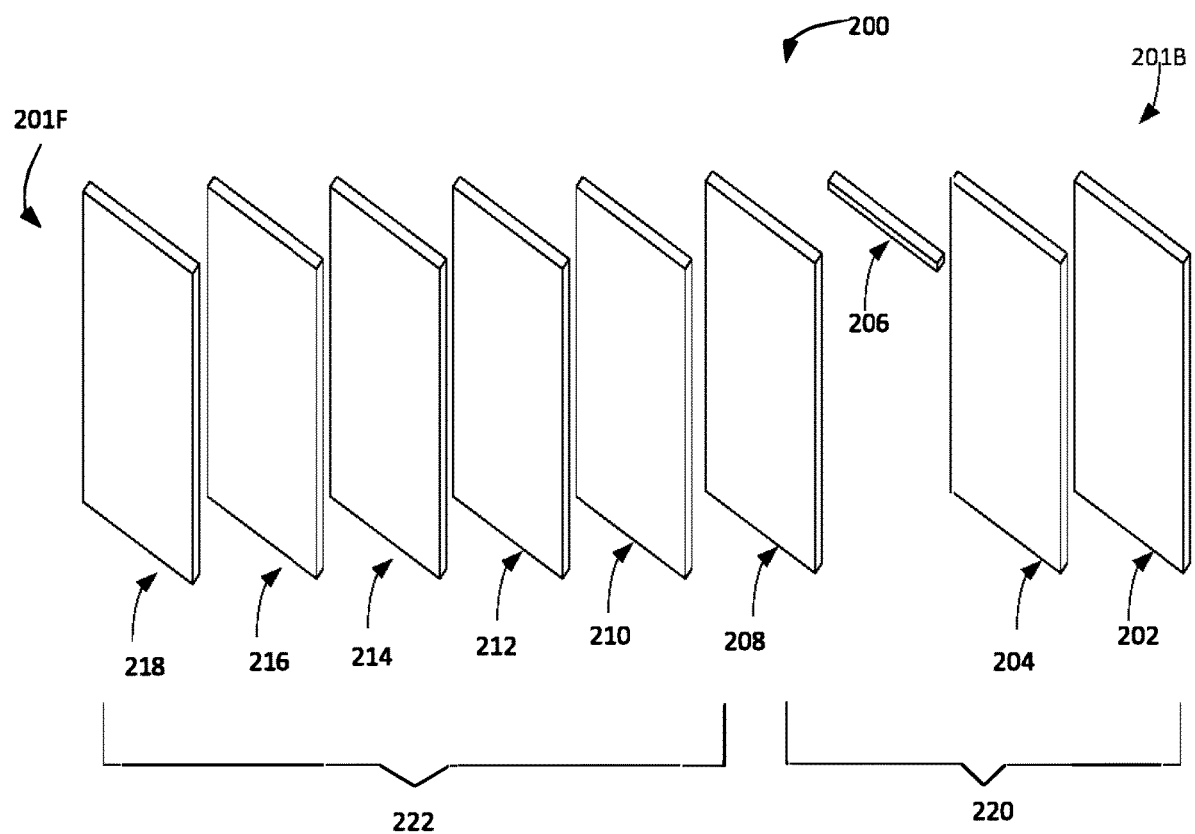
FIG. 2 is a schematic illustrating a PRIOR ART LED LCD display.

FIG. 2 schematically illustrates a traditional LCD display 200, such as a thin film transistor (TFT) LED LCD display. For purposes of discussion, the display 200 is described as a television display; however, it shall be understood by those of skill in the art that the display 200 may be a standalone layered display which may optionally form a part of many other devices, including but not limited to windows, mobile devices (e.g., smart phones, tablet computers, etc.) and other display devices.

Now that plasma displays are no longer in vogue, LCD display technologies, and specifically the LED LCD displays (e.g., televisions) discussed herein, dominate the market. The prior art LCD display 200 has a back side 201B, and a front side 201F from which a viewer views content displayed on the display 200. Going from the back side 201B to the front side 201F, the LED LCD display 200 includes a backing layer (e.g., the television cover's back) 202, a reflector 204, an LED panel 206, a diffuser 208, a first polarizer 210, a thin film transistor (TFT) glass panel 212, liquid crystals 214, a color filter glass panel 216, and a second polarizer 218. As is known, the first polarizer 210 and the second polarizer 218 may be oriented at ninety degrees to each other (e.g., the first polarizer 210 may be a horizontal polarizer and the second polarizer 218 may be a vertical polarizer). The LED panel 206 produces unpolarized light whose flow through the display 200 is controlled primarily by voltage applied to the liquid crystals 214 between the TFT glass panel 212 and the color filter glass panel 216. When no voltage is applied to the liquid crystals 214, the first polarizer 210 polarizes the light emanating from the light source 206. The liquid crystals 214 twist this polarized light to allow it to pass through the second polarizer 218 to the viewer. However, when voltage is applied to the molecules of the liquid crystal 214, they begin to untwist. This movement of the molecules of the liquid crystals 214 changes the angle of the light passing through the first polarizer 210 to the second polarizer 218. Depending on the voltage applied, at least part of the light gets blocked by the second polarizer 218 and makes the corresponding area of the LCD display 200 dark as compared to other areas. The liquid crystals 214 produce no light of their own.

For display of colored content, the LCD display 200 typically includes many pixels, each having three subpixels. Each subpixel includes red, green, and blue color filters, which are provided on the color filter glass panel 216. A liquid crystal cell is associated with each of the subpixels, and is energized or de-energized via transistors of the TFT glass panel 212 to block or transmit light. Through careful control and variation of the applied voltage, coupled with knowledge of human perception (e.g., knowledge of the human eye "rods" and "cones"), the intensity of each subpixel is manipulated so as to collectively cause the pixel to appear a particular intensity and color, including colors other than red, green, and blue (e.g., amber). Content is displayed on the LCD display 200 by this modulation of light emanating from the LED panel 206.

In some prior art LCD displays, the length and height of the LED panel 206 may be approximately equal to the length and height of the display 200. Other LCD displays, such as the LCD display 200, may be edge-lit. That is, the LED panel 206 may, as shown, be provided at an edge (e.g., the upper edge) of the LCD display 200. The diffuser 208 may diffuse (e.g., scatter) the light emanated by the LED panel 206 to enable even irradiation thereof; thus, when the LED panel 206 is powered, a user adjacent and facing the diffuser 208 sees a generally white background. The reflector 204 is an optical element used to reflect the light from the LED source 206 to allow for effective utilization of the light. The diffuser 208, the LED source 206, the reflector 204, and the back cover 202 of the display 200 may collectively be referred to by the artisan as a backlight unit 220 of the LCD display 200. The artisan may collectively refer to the first polarizer 210, the thin film transistor (TFT) glass panel 212, liquid crystals 214, the color filter glass panel 216, and the second polarizer 218 as an LCD panel 222 of the LCD display 200. When the LCD display 200 is in use, a majority of the power supplied to the display 200 (e.g., via a conventional 110/220V outlet) is used by the backlight unit 220.

The artisan understands that one LCD display may twist the light passing through the liquid crystals differently as compared to another LCD display to effect contrast and coloration. Twisted Nematic (TN) LCDs, for example, typically have a twist of 90 degrees or less. High Twisted Nematic (HTN) LCDs are generally based on a higher twist (usually about 110 degrees) and may therefore offer wider viewing angles and improved contrast as compared to TN LCDs. Super Twisted Nematic (STN) LCDs have a twist that is greater than 90 degrees and less than 360 degrees (and is typically between 180 and 270 degrees). Accordingly, it shall be understood that the twist may take a variety of different angles based on the desirable outcome. The artisan will thus appreciate that the LCD display 200, including the backlight unit 220 and the LCD panel 222 thereof, is merely one example of a type of LCD display in use today. The present disclosure encompasses any LCD display technology now known or subsequently developed.

Organic LED (OLED) displays are also known in the art. One key difference between the LED LCD displays and the OLED displays is that the OLED display pixels, unlike the LCD display pixels, provide their own illumination.

While the various technologies discussed above (e.g., smart glass technology, LCD display technology, OLED technology, etc.) continue to progress at a rapid rate, they generally do so on independent paths. There is very little, if any, consolidation of these technologies in a unitary display. For instance, there is no unitary display in the market that includes both an LCD display panel and an OLED display panel. Similarly, there is no LCD display panel or OLED display panel that employs, for example, smart glass technology. The present disclosure is directed to a mixed-mode composite display utilizing two or more disparate technologies (e.g., employs LCD display technology in addition to OLED display technology, employs LED LCD display technology in addition to smart glass technology, etc.). The disclosure may refer to this display as an "intelligent glass" display.

The term "intelligent glass," as used herein, refers to a single or multi-layered panel that is configured to receive an input and can provide a controlled output in response. The input may be, for example, voltage, light, heat, data, or some other contact or non-contact stimulus. The response may be, for example, a change in the aesthetic appearance of the intelligent glass, or another response. The intelligent glass display may include, for example, one or more of smart glass, an organic LED (OLED) display, an LCD display, a liquid crystal on silicon (LCOS) display, or any other such single or multi-layered panel that can provide a controlled output in response to a stimulus. In embodiments, the intelligent glass display may comprise conventional glass having one or more sensors disposed thereon and/or embedded therein. As noted, in embodiments where the intelligent glass display comprises multiple layers, one layer may employ technology disparate from the technology employed by another layer (e.g., the intelligent glass display, in an embodiment, may include a layer comprising smart glass and another layer comprising an OLED display). In embodiments, and as discussed herein, substances and/or objects (e.g., semi-conductor crystals, polarizers, tangible items for sale, etc.) may be disposed between the layers comprising the intelligent glass display.

Figure 3:
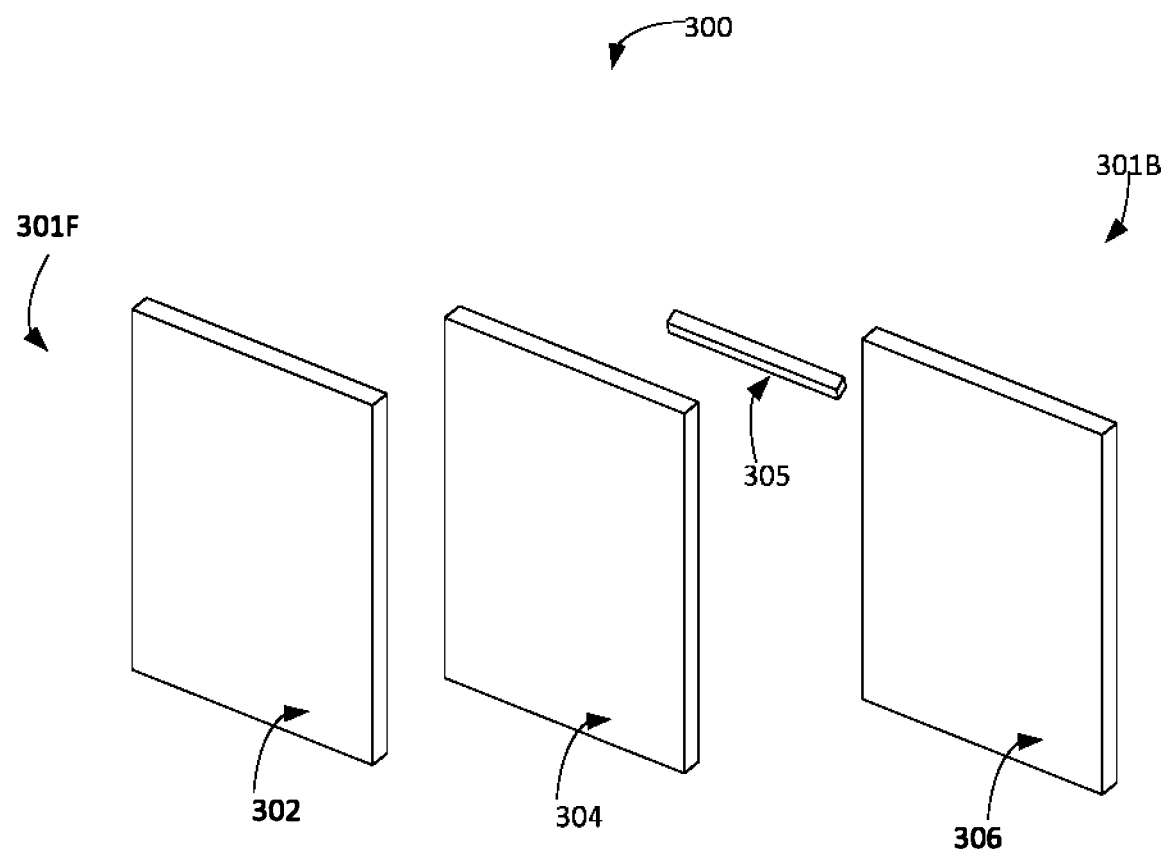
FIG. 3 is a schematic illustrating an intelligent glass display, according to an example embodiment.

Focus is directed now to FIG. 3, which shows an intelligent glass display 300 according to an example embodiment. The intelligent glass display 300 may have a back side 301B, and a front side 301F from which a viewer may view content displayed on the display 300. Going from the front side 301F to the back side 301B, the display 300 may in an embodiment comprise a first (or front) layer 302, a second layer 304, an LED panel 305, and a third (or back) layer 306. The transparency of each layer 302, 304, and 306, and/or the polarization thereof (including of each surface of each layer) may, in embodiments, be selective (e.g., programmable). While the intelligent glass display 300 is shown as having three layers 302, 304, and 306, such is merely exemplary. Any number of layers (e.g., two, five, ten, etc.) may be incorporated in the intelligent display 300 so long as one layer employs technology different from the technology employed by another layer (e.g., one layer employs LCD display technology and another layer employs OLED, LCOS, smart glass, and/or another technology now known or subsequently developed). Further, while FIG. 3 shows the layers 302, 304, and 306 as being generally rectangular, the artisan will appreciate that these layers 302, 304 and 306 may take on any regular or irregular shape and need not be planar. The display 300 may include one or more processors or other controllers and memory having programming instructions stored thereon. The programming instructions may cause the display 300 to operate or at least facilitate operation of the display 300 as set forth herein. In embodiments, a networking device may be provided to allow the display 300 to communicate with electronic devices (e.g., with smart phones, other displays, etc.) over wired or wireless networks (e.g., Bluetooth, Wi-Fi, cellular, or other networks). In some embodiments, the display 300 may be coupled to a content provider (e.g., to Netflix, cable, satellite, Amazon Prime, etc.) and/or a central processing unit to allow the display 300 to selectively emulate the functionality of a traditional television display and/or a computer.

In embodiments, an LED panel 305 may be provided at a top edge of the display 300 in front of the third layer 306 (or another layer). In other embodiments, the LED panel 305 may be provided at a side edge or a bottom edge of the display 300. Embodiments where multiple LED panels 305 are provided are also contemplated. The LED panel 305 may be situated behind the second layer 304 as shown, or elsewhere (e.g., behind or in front of the first layer 302). In embodiments, each of the first layer 302 and the second layer 304 may have an LED panel 305 associated therewith.

The first layer 302 may, in an embodiment, be an LCD panel. For example, the first layer 302 may be the LCD panel 222 of FIG. 2, or a differently configured LCD panel. The artisan will understand, however, that the provision of an LCD panel as the first layer is merely exemplary; in other embodiments, the first layer 302 may be an OLED display panel, or another display panel.

The first layer 302 may, in whole or in part, be selectively transparent (i.e., all or part of the first layer 302 may be caused to transmit light therethrough like a traditional window) but may have robust functionality. In embodiments, an image may be selectively displayed on one or more portions of the first layer 302, and another portion or portion(s) of the first layer 302 may appear transparent to the viewer. One or more contact or non-contact sensors (e.g., CMOS sensors for object detection, infrared sensors for proximity, presence, and/or gesture detection, acoustic sensors for voice recognition, biometric sensors for user verification, oxygen and carbon monoxide sensors for environment monitoring, GPS sensors for positional determination, etc.), whether now known or subsequently developed, may be disposed on, embedded within, and/or provided proximate the first layer 302 (and one or more of the other layers). In some embodiments, the first layer 302 may be configured to display an image projected thereon. For example, the display 300 may include a projector for displaying content on the first layer 302 and/or content may be projected onto the first layer 302 via an external projector. In embodiments where the display 300 is configured for the display of colored content, color filters may be included on at least a part of the first layer 302 (and/or the other layers).

The first layer 302 may, but need not be, touch-controlled. For example, a touch screen interface may be displayed on the first layer 302 to allow a user to control operation of the display 300. The touch interface may include a touch keyboard, icons, and/or other controls to allow a user to configure the display 300 for a particular application. In embodiments, the touch interface may be configured to receive input signals (or "impacts") from humans, animals, organisms, or other energy types. Traditional touch screen films may be used, as well as polymer sensing coatings that can operate as a bacterial or other biosensor lab-on-a-chip surface sensor, or combinations thereof.

In embodiments, the interface for display on the first layer 302 may additionally or alternately be gesture controlled. The skilled artisan understands that gesture control devices, known in the art, recognize and interpret movements of the human body in order to interact with and control a computing system without physical contact. For example, in an embodiment, a viewer may wave at the first layer 302 to cause the display 300 to display content and wink at the first layer 302 to cause the display 300 to become transparent. While gesture control may be incorporated in the intelligent display 300 by any means now known or subsequently developed, in an embodiment, infrared gesture sensors disposed on or proximate the first layer 302 may be used to allow the intelligent display 300 to detect movement of a viewer proximate the display 300. Gesture movements may be observed from a remote fixed point reference monitoring device or the monitoring device may follow the movements of the user by being physically fixed thereto. For example, a helmet or visor may be worn by the user to allow a camera or other fixed gesture viewing scanner to have a constant relevant perspective of viewing angle and focal length to the gesture movements of the user. Additionally, information may be projected or otherwise displayed (e.g., on a multi-layered glass) which may be incorporated into the visor or helmet. The information can assist in dynamically prompting the user for gestures, and may even act as a bio-feedback closed loop establishing a natural use mode of operation.

Additionally, or alternately, the interface may, in embodiments, be a voice-user interface (VUI). For example, the display 300 may have speech recognition capability to enable a user to operate the display 300 in a hand-free manner. In some embodiments, the interface may respond to the voice of only authorized users. In other embodiments, the user may be able to, for example, snap his fingers and/or clap to cause the display 300 to power on or off or to cause the display 300 to switch from one mode (discussed below) to another.

The second layer 304, akin to the first layer 302, may be an LCD panel. Like the first layer 302, the second layer 304 may be selectively transparent (e.g., an image may be displayed on part of the second layer 304 whereas another part of the second layer 304 may appear transparent to the user; or, the entire second layer 304 may be configured so as to appear transparent to the user). While the second layer 304, in this example, is an LCD panel, the artisan will appreciate that in other embodiments, the second layer 304 may be an OLED panel, a different display panel, a smart glass panel, etc. In embodiments, there may be an appreciable distance (e.g., a foot, five feet, twenty feet, etc.) between the first panel 302 and the second panel 304 such that a tangible item, as discussed herein, may be situated therebetween. The second layer 304 may, in embodiments, include an interface as discussed above for the first layer 302 (e.g., a gesture controlled interface, a touch controlled interface, a voice controlled interface, etc.). One or more contact and/or non-contact sensors may be disposed on, embedded within, and/or provided proximate the second layer 304.

The third layer 306 may, in an embodiment, be smart glass (i.e., traditional privacy glass). That is, the third layer 306 may selectively be made opaque (e.g., white) or transparent (e.g., light may be allowed to selectively pass through a part of the third layer 306 and another part of the third layer 306 may block the light). In some embodiments, the third layer 306 may be configured for the projection of content thereon. As discussed herein, when the third layer 306 is made transparent along with the first layer 302 and the second layer 304, a user may be able to see through the display 300 (i.e., through each of the first layer 302, second layer 304, and third layer 306) much like through a traditional window. In some embodiments, a fourth layer may also be provided behind the third layer 306. The fourth layer may comprise, for example, smart glass, and may be made selectively opaque to ensure that an image projected on the third layer 306 is not viewable from behind the display 300.

In some embodiments, the second layer 304 may be omitted, and the display 300 may have a first layer 302 comprising an LCD panel (or another display panel) and another layer comprising smart glass. In these embodiments, the LED panel 305 may be disposed behind the first layer 302 and in front of the smart glass layer.

Importantly, in an embodiment, the example intelligent display 300 may be devoid of a traditional reflector and a diffuser, which are typically employed with LED LCD displays. More specifically, where light outside the display 300 (e.g., behind the third layer 306, such as ambient light, light from light fixtures in the room, etc.) is available, the display 300 may employ this light for use in the display 300 instead of the LED panel 305. Where the display 300 determines (e.g., via the display 300 controller and sensors) that there is no appreciable light outside the display 300, the display 300 may then power on the LED panel 305 and employ light from the LED panel 305 (e.g., angularly projected light) for use in the display 300. Light available for use in the intelligent display 300 generated by any source other than the LED panel 305 associated with the display 300 may be referred to herein as ambient light. In some embodiments, the display 300 may simultaneously utilize ambient light and light from the LED light panel 305 for the display of content. The third layer 306, like the other layers 302 and/or 304, may have sensors disposed thereon or embedded therein. For example, the third layer 306 may include sensors (e.g., photodiodes, phototransistors, photoresistors, cadmium-sulfide (CDS) cells, etc.) to detect the amount of ambient light available for use in the display 300. Where these sensors indicate that there is sufficient ambient light, the display 300 may employ the ambient light instead of light from the LED panel 305 for use in the display 300. Alternately, where these sensors indicate that the ambient light is insufficient (e.g., at night time and/or where the display 300 is situated in a dark room), the display may utilize the light from the LED panel 305 for the display of content. In some embodiments, light from the LED panel 305 may be utilized and all or part of the smart glass layer 306 may be used to reflect the light akin to a traditional reflector.

In embodiments, the display 300 may be operable in each of: (a) a display mode in which content for viewer consumption (e.g., a movie, an interface, or any other content) is displayed on only one of the layers 302, 304 and/or 306; (b) a multilayer display mode in which content for viewer consumption is displayed on two or more layers (e.g., on each of layers 302 and 304); (c) a transparent mode in which each of the layers 302, 304, and 306 appear transparent to the viewer (i.e., the user can see through the display 300 much like through a traditional window); and (d) a privacy mode in which the first layer 302 and the second layer 304 is transparent whereas the third layer 306 is opaque such that the display 300 appears like traditional privacy glass in a privacy mode. The display 300 may be configured such that in each of the display mode and the multilayer display mode, one or more portions of the display 300 (e.g., portions of the first layer 302, the second layer 304, and/or the third layer 306) appear transparent to the user whereas another portion or portions of the display 300 display certain content for user consumption.

In some embodiments, in the multilayer display mode, each of the first layer 302 and the second layer 304 (or two or more other layers comprising the display 300) may be configured to collectively display cohesive blended content. For example, the head of a bird may be displayed on the first layer 302 and its body may be displayed on the second layer 304 to give the image a three dimensional effect. In these embodiments, the location of the viewer proximate the display 300 may be determined (e.g., via sensors disposed on or proximate the first layer 302) so that content can be blended by taking into account the relative location of the viewer with respect to the display 300. Determining viewable perspectives can allow the system to create an appearance of surface "presence mode" content being displayed simultaneously as "depth mode" content. So, as the viewer moves (e.g., moves his or her head or entire body), the depth mode content may appear to move while the presence mode content may appear to be stable in its original location.

The display 300 may, in embodiments, be an augmented reality display. The artisan understands that augmented reality is the integration of digital information with a user's environment in real time. Augmented reality is different from virtual reality, where the entire environment is virtual.

The display 300 may use the existing environment and overlay information on top of the existing environment. The display 300 may be employed in any environment where it is beneficial to overlay digital information on the user's actual environment. The vectored relationship between the user and the display 300 may be tracked in real-time and used to calculate the imagery displayed on the multiple layers of display content. By maintaining a controlled perspective of viewability the user can navigate an experiential physical area while becoming immersed into an augmented reality experience. One example is a football helmet with attached screen system that allows players to view varying field plays, ball position indicators, and player approaching alerts. Another example is a golf visor with an attached screen and gesture system that predictively displays anticipated ball trajectories and displays an augmented reality visualization to the user. Gesture monitoring can allow for hands free mode selection through facial and other movements that can be detected by the gesture detection system. Additional information can be integrated into smart golf club interfaces that provide the angle and force variables for vectored trajectory calculations while the user is gripping and swinging the club.

For example, in embodiments, the display 300 may be incorporated in the sneeze guard of a salad bar housing various food items (e.g., potato salad, lettuce, olives, soup, premium purchase items, etc.). In this embodiment (herein, the salad bar display), the first layer 302 and/or the second layer 304 may include sensors for obtaining information about the various food items in the salad bar. The first layer 302 may be in front of the food items and the third layer 306 may be behind the food items. The second layer 304, where provided, may be behind or in front of the food items. The first layer 302 may selectively display information about the food items (e.g., constituents of the food item, nutritional information, temperature, bacteria content, pricing information, freshness, use-by date, etc., at least some of which may be gleaned using sensors as discussed herein that may be situated behind the first layer 302, or at or near the food item as necessary). The user may thus be able to simultaneously view each of: (a) information about the food item displayed on the first layer; and (b) the food item with which the information is associated. The first layer 302 may also display other information (e.g., time of day, any special offers applicable to the salad bar patrons, advertising, upsell information, etc.) that the salad bar patrons may consider pertinent.

The sensors on or in the first layer 302 and/or the second layer 304 of the salad bar display may include, for example, material sensing sensors (e.g., spectroscopic infrared sensors having a near-infrared source associated therewith); the near-infrared source may excite the molecules of the various food items, and analyze light reflected off the vibrating molecules. Because the light reflected off one food item (e.g., potato salad) would be different from the light reflected off another food item (e.g., olives), these reflections may be evaluated by the display 300 controller to identify the food item. This identification information may be displayed on the first layer 302 and/or the second layer 304.

In some embodiments, the sensors associated with the first layer 302 and/or the second layer 304 may comprise temperature sensors (e.g., thermal imaging cameras). For instance, in an embodiment of the salad bar display, one or more of the sensors may comprise a non-contact infrared sensing array configured to measure the temperature of the food items in the salad bar (e.g., of the soup), which may then be displayed on the first layer 302 and/or the second layer 304 in front of the food item or elsewhere.

The sensors on or in the first layer 302 and/or the second layer 304 of the salad bar display, and/or at or near the food items, may further include bacteria sensors. The bacteria sensors may determine the bacteria content of the food items in the salad bar, and may display same on the first layer 302 and/or the second layer 304 to convey to the user that the food items are not bacteria-ridden.

In some embodiments, a video illustrating the making of the food item (e.g., a video showing the chef making the particular potato salad) may be displayed on the first layer 302 and/or the second layer 304. The salad bar display may thus, in embodiments, eliminate the need for physical signage traditionally employed in salad bars.

Of course, while the display 300 may in an embodiment be integrated with salad bar sneeze guards as discussed above, such is merely one example application; the display 300 may be situated in any environment where it is desirable to evaluate food and/or drink items. For instance, in an embodiment, the display 300 may be situated in a kitchen, a dining area, or other location, and the first layer 302 and/or one or more of the other layers 304, 306 may include spectroscopic sensors having a near-infrared light source associated therewith. Once a food or drink item is placed proximate the display 300 (e.g., proximate the first layer 302 thereof), the source may shine the near-infrared light on the food or drink item and cause the molecules of the item to excite. The sensor may then analyze the light reflected off the vibrating molecules of the food or drink item. Because the light reflected by one food or drink item will be different from the light reflected by another food or drink item, the display 300 may identify the food or drink item, including in some embodiments the constituents thereof, by the unique optical signature. Upon identification of the food or drink item, the display 300 (e.g., via electronics therein) may access a database, which may be stored locally or remotely and accessed over a network, to retrieve information regarding the food or drink item. For example, the information may include caloric information and/or whether the food or drink item complies with certain specifications (e.g., gluten free, nut free, etc.). In other embodiments, information about the food or drink item may be unavailable in the database due to, for example, the food or drink item being homemade rather than purchased. Here, the spectroscopic sensor may be able to sufficiently identify, without the use of a database, specific information about the food or drink item, including but not limited to caloric information, constituents making up the food or drink item, protein content, etc. The information may then be displayed on the display 300 (e.g., on the first layer 302 and/or another layer) for the user. Excitation wavelengths displayed onto the food and surfaces may be selectively projected in varying wavelengths such as infrared (to display invisible-ink machine readable patterns), varying color temperatures of light to show appealing presentation of food products, or ultraviolet (e.g. UV-A, B, or C) to sterilize surfaces and reduce foodborne pathogens, for example.

In another embodiment, an intelligent glass display 300 may be integrated into an infant incubator, for example. An infant incubator is an apparatus that provides a controlled environment for the care and protection of babies. As is known, the surfaces of the incubator often comprise transparent glass, through which caregivers (e.g., doctors, nurses, etc.), parents, and others may view the baby. In this embodiment, at least part of the first layer 302 of the display 300 may be in front of the baby in the incubator and at least part of the second layer 304 of the display 300, where provided, may be behind the baby. The third layer 306 may be behind the baby in the incubator. Information about the baby in the incubator (e.g., temperature, heart rate, pulse, and/or other vital signs, as obtained using sensors traditionally employed with the incubator), may be displayed on the first layer 302. In some embodiments, the information displayed on the first layer 302 and/or the second layer 304 may include coded identification information identifying the baby as belonging to particular parents. The viewers may thus be able to view this digitally displayed information along with the baby with whom the information is associated. In some embodiments, the display 300 may remain opaque until an authorized user (e.g., a physician, parents or guardians of the particular baby in the incubator, etc.) comes proximate the incubator, at which the point the authorized user may be identified (e.g., via a biometric reader disposed on or embedded within the first layer 302, via a barcode reader that scans a band or card of the authorized user to validate the identity of the user, via identification of graphically encoded icons, etc.) and the display 300 may become transparent to allow for the baby to be viewed through the display 300.

In another example embodiment, the display 300 may be integrated with a 3D printer. As is known, a 3D printer allows for the creation of a physical object from a three-dimensional digital model, typically by laying down many thin layers of a material in succession. In this embodiment, the first layer 302 of the display 300 may be in front of the extruder, and the second layer 304, where provided, may be in front of or behind the extruder. The third layer 306 may be behind the extruder. The first layer 302 may initially display an image of the finished object being created using the 3D printer. Assume, for the purposes of illustration, that the object being created using the 3D printer is a cup having a body and a handle. An image showing what the final 3D-printed cup will look like (i.e., an image of the cup body and the handle) may initially be displayed on the first layer 302. As the 3D printer creates a part of the cup (e.g., creates the handle), the image displayed on the first layer 302 may be modified such that the user sees an image of the cup body in conjunction with the actual physical cup handle that has been created by the 3D printer (i.e., the cup handle may be deleted from the image displayed on the first layer 302 when the physical cup handle been created by the 3D printer). As additional parts of the object being created using the 3D printer are printed, the image displayed on the first layer 302 may be successively modified so that these physical parts of the object being created take the place of the corresponding parts of the object in the image. The user may thus simultaneously view the portion of the object that has been 3D printed along with an image of the remaining portion of the object yet to be printed, and can therefore easily view the progress that has been made in view of the image of the anticipated final object.

The display 300, in another example embodiment, may replace one or more windows in a residence, office, or other structure. In the transparent mode, the display 300 may allow the user to see the scene through the display 300 akin to a traditional window. In the display mode and/or the multilayer display mode, an image may be displayed on all or part of the first layer 302 (and/or the other layers) such that the display functions as a regular display or an augmented reality display. The display 300 may have wide applicability and may replace the traditional television displays and computer monitors in use today. In embodiments, the display 300 may be used for making voice and/or video calls (e.g., through Skype, Facetime, MSN messenger, or other software). For example, where a user is conversing with a friend (or relative, coworker, etc.) over a video call, a live video feed of the friend, session length, and other pertinent information may appear on a part of the display 300 (e.g., on the first layer 302 and/or another layer) and the user may be able to see the outside scene through other parts of the display 300.

Sensors, such as cameras or video cameras, may additionally be utilized to take pictures and/or video of the user. The video or pictures may be transmitted to the friend in real time.

In some embodiments, two or more windows (e.g., a window in one room and another window in another room, or two windows situated side by side) may each be replaced with the intelligent display 300; in these embodiments, the sensors on the first layer 302 and/or another layer may sense the presence of the user and the content being displayed thereon may be shifted from one display 300 to another as the user moves from one location proximate one display to a different location proximate the other display.

In some embodiments, the display 300 may be integrated with a cupboard, closet, drawer, or other receptacle. For instance, the door of a cupboard may be replaced with the first layer 302, and the back surface of the cupboard may be replaced with the third layer 306. The second layer 304, where provided, may be in front or behind the items situated in the cupboard. In these embodiments, the intelligent display 300 may be made selectively transparent or opaque to reveal or hide the items in the cupboard. Object detection sensors (e.g., IR arrays, cameras, and/or CMOS sensors with associated software) may be provided on the first layer 302 and/or another layer to identify the items situated within the cupboard. In embodiments, the user may be able to use the interface to cause the display 300 to list or otherwise point out the items within the cupboard. For example, the user may say the word "cup", and an arrow pointing to the cup may appear on the display 300 associated with the cupboard in which the cup is situated. The display 300 may therefore assist the user in identifying any of the items situated within the cupboard without having to open the cupboard. In some embodiments, a display 300 may be integrated with two or more cupboards, e.g., with all the cupboards in the kitchen, and allow the user to quickly and conveniently determine the cupboard in which any particular item is located. Of course, the display 300, e.g., the first layer 302 thereof, may also be made opaque or selectively opaque to preclude a viewer from viewing the items within the cupboard without opening same.

The display 300 may, in embodiments, be associated with a refrigerator. In these embodiments, the first layer 302 may, for example, replace the fridge door or otherwise be situated in front of the items stored in the fridge. The back layer 306 may be situated behind the items in the fridge, or where the fridge has a conventional white backing layer, be omitted altogether. The second layer 304, where provided, may be situated in front of or behind the items in the fridge. The user may cause the display 300 (e.g., the first layer 302) to become transparent (using e.g., a gesture controlled, voice controlled, or other interface) to view the items being stored in the fridge. The display 300 may employ the sensors on or within the first layer 302 and/or the other layers to identify the items in the fridge and display a listing of these items on the first layer 302. In embodiments, content for user consumption may be displayed on the second layer 304 (e.g., the first layer 302 may be transparent and the user may view the content being displayed behind the items in the fridge). Identified "missing items" may be shown in a virtual (or augmented) reality mode showing the missing item as an avatar of the missing item on a selected layer or layers of the display 300.

In some embodiments, the display 300 may be incorporated in aircraft. For example, the shade of the aircraft window may be removed and the display 300 may be incorporated in the aircraft window.

Figure 4:
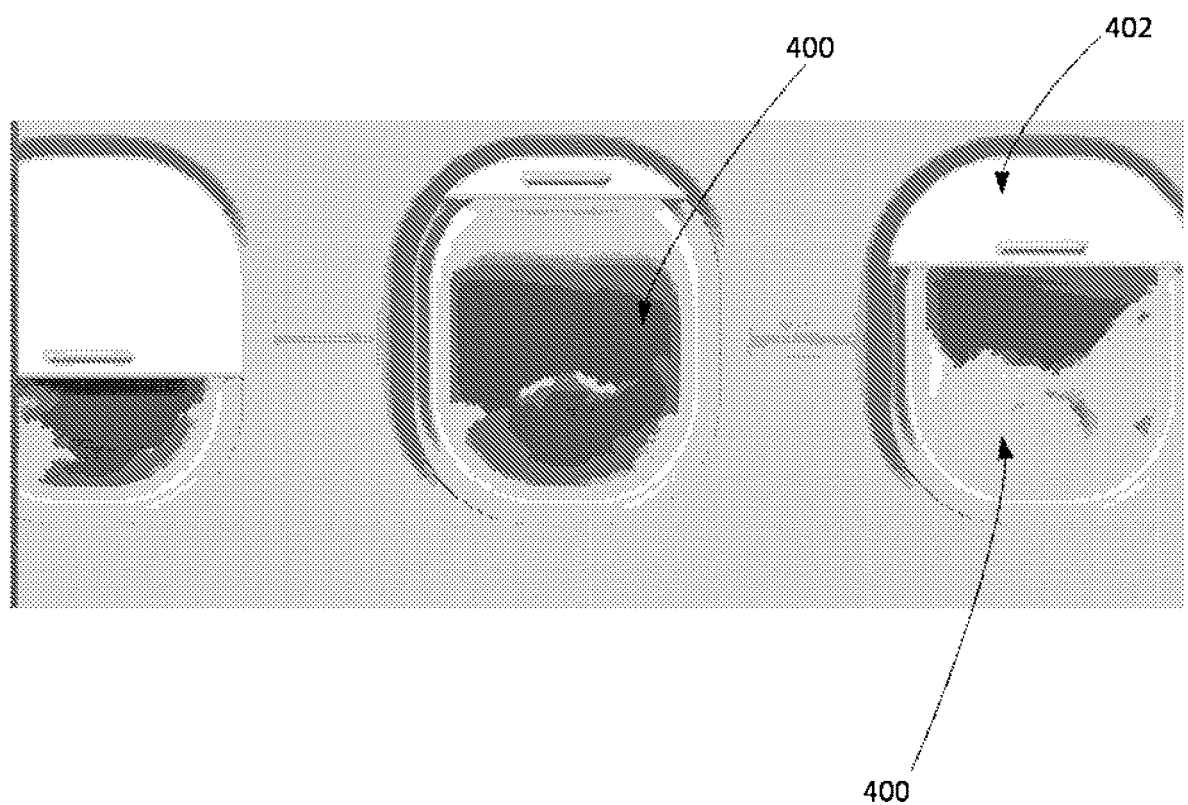
FIG. 4 is a front view of PRIOR ART aircraft windows and window shades.

FIG. 4 shows prior art windows 400 of an aircraft. As is known, each aircraft window 400 may have associated therewith a window shade 402. The window shade 402 may be made of plastic, and as shown in FIG. 4, may be movable. For example, a passenger in the aircraft may physically pull down the shade 402 to block the window 400, as such may provide the passenger with a darker environment within the aircraft cabin. When the passenger wishes to see through the window 400, the passenger may push the shade 402 up, which may allow light to pass through the window 400 into the aircraft cabin.

As smart glass and other intelligent glass technologies become more and more prevalent, consumers may expect that the aircraft windows 400 will comprise intelligent glass. Replacing the windows 400 of existing aircraft with intelligent glass panels, however, may be a costly and arduous process. The skilled artisan understands that the installation and operation of many aircraft parts, including aircraft windows 400, must meet stringent safety requirements, which will also need to be met by the retrofitted intelligent glass panels replacing the windows 400. Moreover, if the aircraft windows 400 are replaced with intelligent glass panels, the aircraft may have to undergo much testing to ensure that the safety criteria continue to be met.

Figure 5:
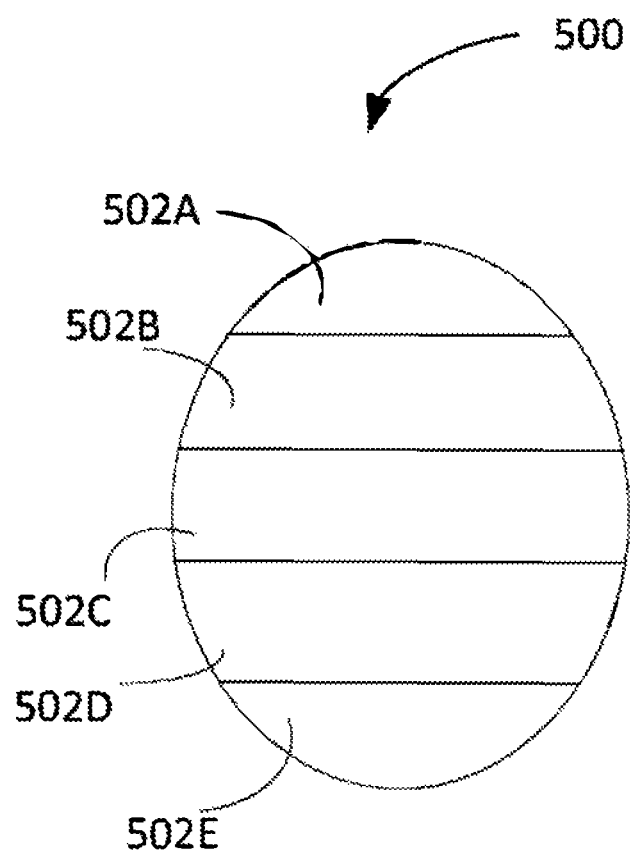
FIG. 5 is a side view of an aircraft window illustrating an intelligent glass window shade system according to an example embodiment.

Attention is directed now to FIG. 5, which shows an aircraft window incorporating an intelligent glass shade 500 according to an example embodiment of the present disclosure. In an embodiment, the window shade 402 (FIG. 4) may be removed and the intelligent glass shade 500 may be secured to or otherwise disposed on the inner surface of the aircraft window 400. Such may allow the window 400 to effectively function as an intelligent glass window without the need to replace the window 400 itself with an intelligent glass panel. While FIG. 5 shows a generally oblong intelligent glass shade 500, the artisan will readily appreciate that the shade 500 may take on other regular or irregular shapes. In a currently preferred embodiment, the shape of the shade 500 may generally correspond to the shape of the window (e.g., the window 400) with which the shade 500 is associated. In an embodiment, the intelligent glass shade 500 may alternately or additionally be disposed on the outer surface of the window 400 (i.e., the surface of the aircraft window viewable from outside the aircraft).

In an embodiment, the transparency of the intelligent glass shade 500 may be controlled via a switch (e.g., a window switch or a dimmer switch) situated proximate or on the shade 500. For example, a passenger may turn a dimmer switch to cut power to the shade 500, which may preclude light from entering the aircraft cabin through the window 400. In other embodiments, the transparency of the shade 500 may be controlled remotely (e.g., via a mobile phone, laptop, or other mobile device). In other embodiments still, the shade 500 may be touch-controlled. For example, in an embodiment, the intelligent glass shade 500 may include a touch screen OLED display; a passenger may, for instance, tap the shade 500 with his finger once to cause same to become transparent and tap the shade 500 twice to increase the opacity thereof. The skilled artisan understands that remote controlled and touch controlled intelligent glass panels are commercially available; as noted above, however, the disclosure also encompasses intelligent glass panels employing technologies that are subsequently developed.

The passenger (or another) may, in embodiments, be allowed to demarcate the portion of the shade 500 he wishes to become transparent (or opaque). For example, in an embodiment, the passenger may use his index finger to draw a circle (or square or other shape) that encompasses a portion of the shade 500, and only this portion of the shade 500 may become transparent (or opaque). The passenger may thus be allowed to customize the size and shape of the area of the window 400 through which the light passes into the aircraft cabin.

In some embodiments, all or part of the shade 500 may be a touch screen display configured for the display of content. For example, in an embodiment, the passenger may be able to couple (e.g., wirelessly or over a wired connection) his smart phone, smart watch, smart wristband, or other portable device to the shade 500. In these embodiments, content (e.g., a movie, a song, a presentation, etc.) accessed on the smart phone (or other mobile device coupled to the shade 500) may be displayed on the shade 500 for viewer consumption. In embodiments, a passenger may also control his smart phone (or other mobile device) via the touch screen display of the intelligent glass shade 500. It is envisioned that the intelligent glass shade 500 may allow a passenger to project content thereon. In other embodiments, the intelligent glass shade 500 may include a projector to allow content to be projected elsewhere (e.g., on the seatback). In other embodiments still, the intelligent shade 500 may include a three dimensional holographic projector that may project immersive three dimensional content into the aircraft cabin (e.g., in front of the passenger).

In embodiments, the shade 500 may be configured to emit light of one or more colors (e.g., include LED or other lighting mechanisms); thus, for example, when the aircraft passengers are celebrating an event, the passengers may cause the intelligent shade 500 to function as a disco light.

Typically, in an aircraft, various control buttons, switches, dials, knobs, etc., are located proximate the passenger seat (e.g., on an overhead console, on the passenger seat's arm rest, on the seatback of the passenger seat in front, etc.). These controls may, in embodiments, be incorporated in the intelligent shade 500 instead. For example, a touch interface may be displayed on all or part of the intelligent glass shade 500, and the passenger may be able to call a flight attendant, change the fan settings, turn on a reading light, etc., using this touch interface.

The interface (e.g., touch interface) provided on the intelligent shade 500 may, in embodiments, be robust and may allow the shade 500 to serve as a multi-purpose kiosk. For example, in an embodiment, the intelligent shade 500 may incorporate the functionality of a television display that may, in prior art aircraft, be situated on the seatback. Similarly, in embodiments, the intelligent shade 500 may be coupled (e.g., over a wired or wireless network) to a computing device associated with (e.g., resident on) the aircraft; in these embodiments, the passenger may use the interface displayed on the intelligent shade 500 to order items from duty free shops, to browse content online over the web, to schematically display a flight path illustrating the current location of the plane, etc. In embodiments, the intelligent shade 500 interface may be projected by the intelligent shade 500 onto the seat back, overhead console, or on other aircraft components. Alternately, or in addition, the intelligent shade 500 interface may be holographic and may be displayed above the passenger seat or elsewhere within the cabin.

In embodiments, the interface of the intelligent shades 500 may allow for one passenger to communicate with another passenger or passengers aboard the plane. For example, a passenger seated at the front of the aircraft may use the intelligent glass shade 500 associated with the window proximate his seat to communicate with a passenger seated at the back of the aircraft over the intelligent glass shade 500 proximate the seat of the latter. The two (or more) passengers may therefore be allowed to play games (e.g., chess, checkers, video poker, etc.), work, or otherwise communicate with each other via the intelligent glass shades 500. In some embodiments, the interface of the intelligent glass shade 500 may also allow for "screen sharing"; for example, a passenger may be able to share content displayed on his intelligent glass shade 500 with the intelligent glass shade 500 associated with the window proximate one or more other passengers.

The interface of the intelligent glass shade 500 may, in embodiments, be gesture controlled. The skilled artisan understands that gesture control devices, known in the art, recognize and interpret movements of the human body in order to interact with and control a computing system without physical contact. For example, in an embodiment, a passenger may be allowed to wave at the intelligent glass shade 500 to cause same to switch from transparent to opaque or vice versa. Or, for instance, the passenger may wink or point at the intelligent glass shade 500 interface to apprise the flight attendant that he needs another drink. While gesture control may be incorporated in the intelligent glass shade 500 by any means now known or subsequently developed, in an embodiment, infrared gesture sensors disposed on or proximate the shade 300 may be used to allow the intelligent shade 500 to detect movement of the passenger close to the intelligent glass shade 500.

The intelligent glass shade 500 may, in embodiments, be used to control the temperature within the aircraft cabin. For instance, when a passenger desires to increase (or at least maintain) the localized temperature within the aircraft cabin, he may cause the shade 500 to become transparent, which may allow sunlight and heat to enter into the aircraft cabin. Alternatively, the passenger may cause the shade 500 to become opaque to preclude sunlight and heat from entering into the cabin.

Figure 7:
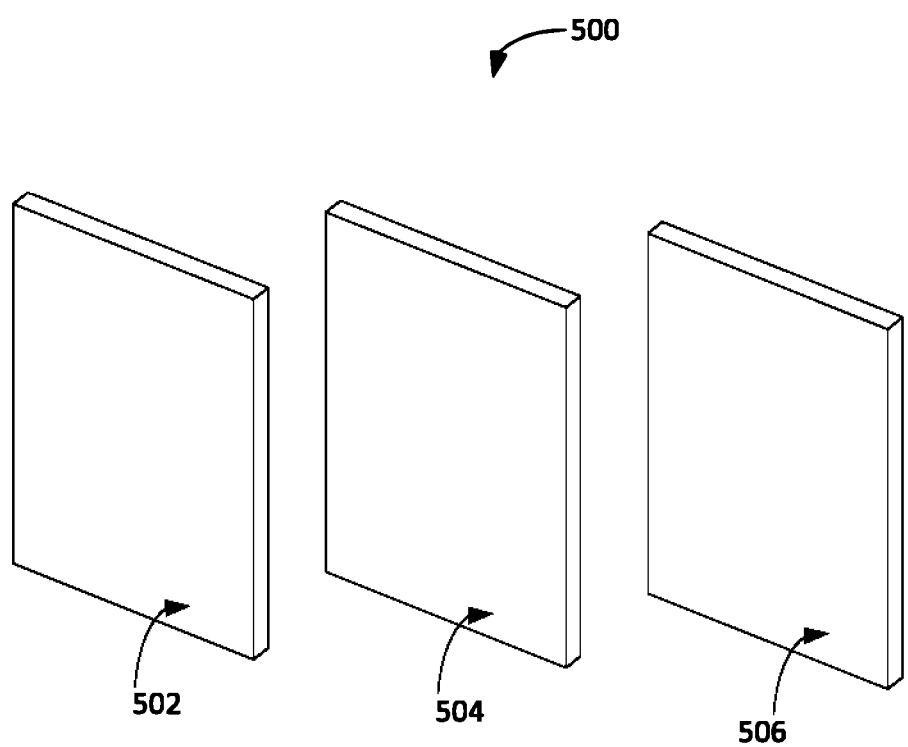
FIG. 7 is a schematic illustrating an intelligent glass window shade display, according to an example embodiment.

As noted, in embodiments, the intelligent shade 500 may be multi-layered and may be adhered to the window 400 such that an outermost layer of the shade 500 is adjacent the window and an innermost layer of the shade 500 faces the aircraft cabin. For example, and with reference to FIG. 7, the shade 500 may include an outermost layer 502 inwardly adjacent the window 400 (not shown in FIG. 7), an innermost layer 506 facing the aircraft cabin, and a middle layer 504 sandwiched between the outermost layer 502 and the inner most layer 506. Such may give the passenger additional flexibility when controlling the temperature of the aircraft cabin via the intelligent glass shade 500. For example, the passenger may cause the two or more layers of the shade 300 to become transparent to allow sunlight and heat to enter into the aircraft. Alternately, the passenger may cause the outermost layer 502 of the shade 500 to become opaque so that no (or only a minimal amount of) sunlight heats up the inner layer 506. Such a multi-layer configuration may increase the longevity of the shade 500 because overheating of the inner layer 506 of the shade 500 may be avoided by darkening the outer layer 502 thereof. This configuration may also allow for the use of intelligent glass panels (at least on the inner layer(s) of the shade 500) that may not be otherwise employed in aircraft because they are susceptible to being overheated. The layers 502, 504, and 506 may but need not be equidistant, and as noted above, may employ disparate technologies. The artisan will understand that any number of layers (e.g., layers 502, 504, and 506) may likewise be incorporated in the intelligent shade 300.

In an embodiment, one or more materials may be disposed between the layers. For example, in an embodiment, Kevlar may be disposed between the layers 502 and 504, which may preclude bullets fired at the window 400 from entering the aircraft cabin. Or, for example, another damping substance (e.g., a damping adhesive as disclosed in U.S. patent application Ser. Nos. 15/365,923 and 15/678,392, which are incorporated by reference herein in their entireties) may be disposed between the layers 502 and 504 (and/or between the layers 504 and 506) to allow the aircraft having the intelligent shade 500 to more safely withstand a crash. As disclosed in the '923 and '392 Applications, the damping adhesive may have particles dispersed therein which act to disperse impact forces which may be received by the window 400, which may prevent the window 400 from breaking in the event of a substantial impact.

In an embodiment, the intelligent glass shade 500 may be used to project content configured to be viewed from the exterior of the aircraft (herein, "exteriorly configured content"). For example, where the intelligent glass shade 500 is disposed on the inner surface of the aircraft window 500, the exteriorly configured content may be projected through the window 400. Or, for example, the exteriorly configured content may be projected using the intelligent glass shade 500 disposed on the outer surface of the window 400. The exteriorly configured content may include, for example, digital signage (e.g., dynamic video or multimedia content). The exterior surface of the aircraft may thus effectively be used as a billboard on which advertising is dynamically displayed. Such functionality may have wide applicability. For instance, multiple airline carriers may share an aircraft during the course of the year and may cause their respective names and logos to be selectively displayed on the exterior of the aircraft without having to repaint the aircraft. Or, for example, the exteriorly configured content may include animals (e.g., hawks, snakes, foxes, etc.) which birds consider to be predatory, as such may reduce the risk that birds will unintentionally crash with the aircraft during flight.

In some embodiments, the exteriorly configured content may impart a novelty factor to the aircraft. For instance, in embodiments, the exteriorly configured content may serve to hide the plane outer surface from view (e.g., the scene outside the aircraft, including blue skies, clouds, etc., may be successively captured and projected on the aircraft outer surface such that the aircraft outer surface appears to be part of the scene and the aircraft is effectively shielded from view). Dynamic and differential viewpoints can be generated and displayed in real-time to strategically create a camouflage or chameleon effect from a distant viewer's perspective.

Figure 6:
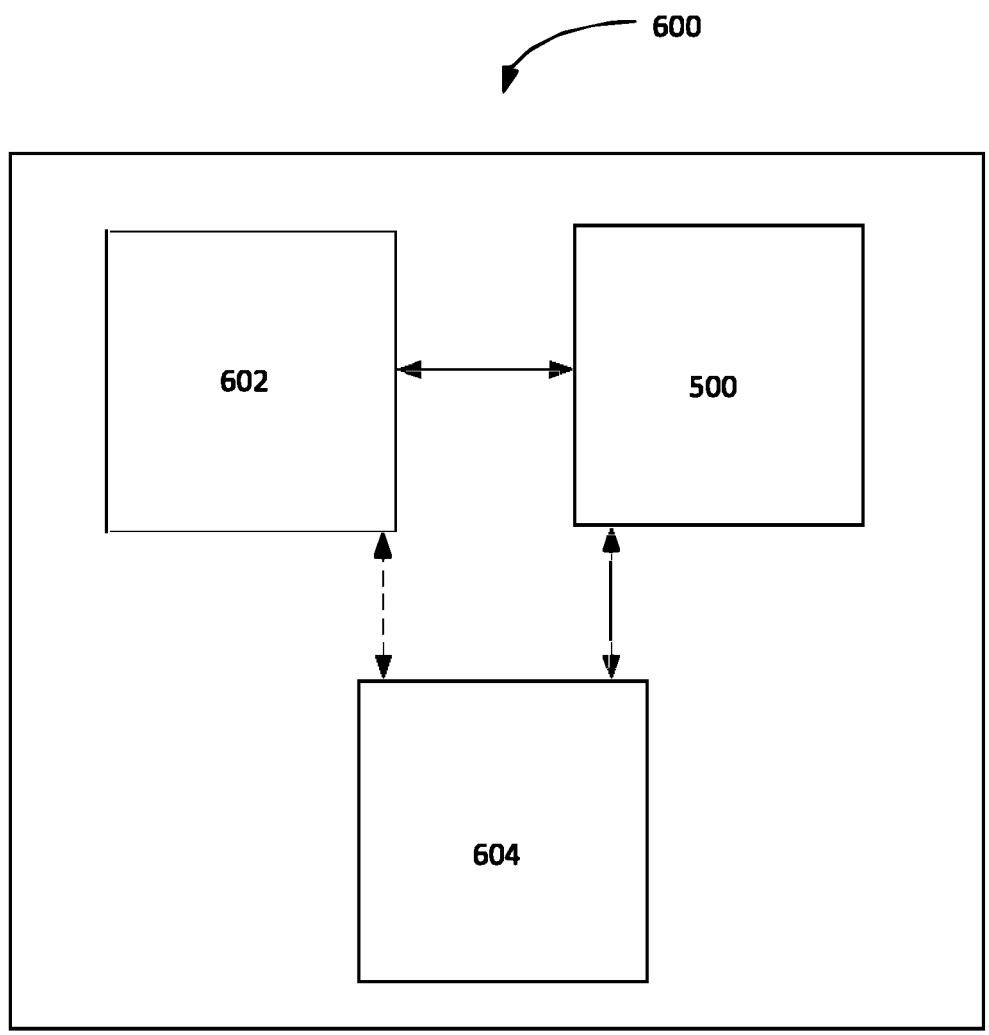
FIG. 6 is a schematic illustrating the intelligent glass window shade system for FIG. 5.

As discussed above and in additional detail below, in embodiments, the capabilities of the intelligent shade 500 may enhance the overall user experience of the passengers of an aircraft. The disclosure above outlines that the intelligent shade 500 may have various capabilities (e.g., have a touch screen interface, have a display projector, etc.). In some embodiments, and as shown in FIG. 6, the intelligent shade 500 may be part of an intelligent shade system 600 that includes other aircraft components 602.

More particularly, the intelligent shade system 600 may comprise the intelligent shade 500, aircraft component(s)

602, and a computing device 604. The computing device 604 may include a digital processor or other controller, memory, and, in embodiments, an input/output device. The computing device 604 may reside on the aircraft in whole or in part and may be in data communication with the intelligent shade 500. In embodiments, the computing device 604 may also be in data communication with the aircraft component(s) 602. The computing device 604 may include (e.g., in memory) computer executable instructions that allow the intelligent shade system 600 to function in line with the disclosure herein.

The intelligent shade system 600 may be configured to personalize and/or otherwise enhance the experience of the passengers aboard the aircraft. The aircraft component 602 may comprise contact and/or non-contact sensors. In an example embodiment, the aircraft component 602 is the overhead console above the passenger seat and the sensor is a temperature sensor; the aircraft component 602 may communicate with the intelligent shade 500 to control the localized temperature within the aircraft cabin as discussed above (e.g., if the temperature sensor senses that the localized temperature within the aircraft cabin is too low, the intelligent shade 300 may turn transparent to allow for heat and sunlight to enter into the aircraft cabin).

In another example embodiment, the aircraft component 602 may be a passenger seat and the sensor may be a non-invasive (or other) blood glucose sensor situated on or proximate the seat. The sensor may, for example, sense that the blood sugar of the passenger in the seat is low, and thereupon, the intelligent shade 500 may automatically call the flight attendant (e.g., the intelligent shade 500 proximate the passenger seat may send a message that is displayed on the intelligent shade 500 proximate the flight attendant seat and indicate that the flight attendant should bring the passenger something to eat). Alternately, or in addition, the sensor may be an electrocardiogram (or an electroencephalogram) sensor disposed on the passenger seat; where the computer 604 determines via the electrocardiogram sensor that the passenger is sick (e.g., where the passenger's cardiac electrical potential waveforms are irregular), the system 600 may take appropriate action (e.g., the computing device 604 may, via the intelligent shade 500 or otherwise, communicate with the flight attendant and/or apprise the pilot that he should land the plan at the nearest airport so the passenger can get medical treatment).

Similarly, the aircraft component 602 may be the seatback of the seat in front of the passenger and the sensor may be an oxygen sensor. When the computing device 604 determines via the oxygen sensor that the oxygen levels in the aircraft cabin are low, the computing device 604 may cause the oxygen masks to be deployed.

In embodiments, the sensor(s) in communication with the computing device 604 may also be situated elsewhere (e.g., on the intelligent glass shade 500 itself, on the passenger, etc.). For instance, in an embodiment, the passenger may wear a nausea and seizure detecting biosensor which may inform the flight attendant (e.g., via the intelligent shade 500) that the passenger appears to have nausea or a seizure.

The intelligent shade system 600 may thus be used not only to enhance passenger experience but also to monitor their health.

In some embodiments, the intelligent shade 500 may include a biometric sensor which the computing device 604 of the intelligent shade system 600 may use to identify the passenger and his preferences. The biometric sensor may, for example, scan the iris, fingerprints, facial features, handwriting, etc., of the passenger. In these embodiments, the passenger may provide an initial biometric sample (e.g., the passenger may provide a thumbprint when flying in the aircraft with the intelligent shade 500 the first time) against which subsequent biometric samples provided by the passenger are compared. Once the identity of the passenger is confirmed, the intelligent shade system 600 may automatically tailor its operation in line with the preferences of the particular passenger. For example, if the passenger likes to drink a particular drink, upon identification of the passenger, the intelligent shade 500 may communicate with the flight attendant and ask her to offer same to the passenger. Or, for instance, the intelligent shade 500 may control the temperature of the aircraft cabin as discussed above in line with the individualized preferences of the passenger (or modify the fan settings, cause the passenger seat to vibrate to give the passenger a massage, etc., in line with the preferences of the passenger). In some embodiments, instead of or in addition to the biometric sensor, the intelligent shade system 600 may determine the identity of the passenger by communicating with a mobile device (e.g., a smart phone) personal to the passenger. For instance, in an embodiment, the computing device 604 may identify the passenger by automatically communicating with the passenger's smart phone to retrieve the device identification number thereof (e.g., an Android ID, a Google Advertising ID, a Universal Device ID, etc., of the particular mobile device associated with the passenger).

While not required, transparency of the aircraft shades 500 may be programmed to change automatically based on the meeting of an external condition. For instance, the transparency of the shade 500 may change based on the location of the aircraft (as determined using GPS, for example). Thus, in embodiments, the shades 500 may automatically become transparent when the aircraft is proximate the Grand Canyon National Park, the San Francisco Bay Bridge, or other such site which the passengers may wish to view from the aircraft. In some embodiments, transparency of the aircraft shades 500 may be programmed to change based on the time of day or a crew member's global override to see outside the plane. For example, the shades 500 may automatically become opaque from 2 am to 6 am to allow the passengers to have restful sleep.

While the disclosure above discusses the intelligent shade 500 and the intelligent shade system 600 as catering to one or more passengers, it is envisioned that in embodiments, the intelligent shade system 600 may also cater to aircraft personnel (e.g., pilots). For example, in an embodiment, the windows of the cockpit may comprise the intelligent glass shade 500. In these embodiments, the intelligent shade system 600 may identify the particular pilot and may allow the intelligent shade 500 to function in line with the pilot's preferences and health measurements. In some embodiments, the functionality of one or more of the controls that are typically located on various consoles in the cockpit may instead be provided on the intelligent shade 500. The pilot may, for example, cause the aircraft wheels to be pulled in by swiping his finger on the intelligent shade 500 in an upward direction or by gesturing in an upward direction. Or, for example, the pilot may cause the aircraft to enter into the autopilot mode by giving a thumbs-up signal to the intelligent shade 500 in the cockpit. The intelligent shade system 600 may, in embodiments, also monitor the health of the pilot (e.g., via biosensors disposed on or proximate the pilot's seat) and take appropriate action based on a determination that the pilot is indisposed (e.g., if a biosensor indicates that the pilot's blood alcohol level is above the legal flying limit, the intelligent shade system 600 may automatically activate the autopilot mode and apprise the control tower of the infraction).

In some embodiments, the intelligent shades 500 in the cockpit may be used to train pilots. For example, virtual imagery may be displayed on the intelligent shades 500 and the pilot in training may virtually maneuver the plane (e.g., using traditional controls in the cockpit consoles and/or using touch-controlled and/or gesture-controlled controls on the intelligent shade 500). In some embodiments, the intelligent shade 500 in the cockpit having the various aircraft controls may include eye tracking capability, and a user may be able to control the operation of the aircraft using his eyes alone. The intelligent shade 500 may thus, in embodiments, allow quadriplegics to fly a plane. Of course, the intelligent shades 500 in the main cabin may also include eye tracking software such that a passenger can make a selection using his eyes alone (e.g., a passenger may call a flight attendant by eyeing the virtual flight attendant button on the intelligent shade 500).

As noted above, in embodiments, a passenger may use the intelligent shade 500 proximate the passenger to selectively communicate with another passenger via the intelligent shade 500 proximate the other passenger. In some embodiments, each intelligent shade 500 may be in data communication with the other intelligent shades 500 in the aircraft. The intelligent shades 500 may thus collectively form an array that may be used to monitor various characteristics (e.g., air pressure, temperature, etc.) within the entire cabin or in sections thereof.

The aircraft window shades 500 may also, in embodiments, be controllable remotely by aircraft personnel; for example, the pilot may cause all the window shades 500 in the aircraft to become opaque at the touch of a button in the cockpit (or at the touch of a virtual button provided on an interface of the intelligent shade 500 associated with a window in the cockpit).

In some embodiments, one or more intelligent shades 500 may be powered independently of the aircraft (e.g., via lithium ion or other batteries), as such may ensure that the intelligent shades 500 continue to operate as desired even if the aircraft batteries and/or alternators are down. In other embodiments, the intelligent shades 500 may be powered by the aircraft batteries and/or alternators. In other embodiments still, the intelligent shades 500 may be powered wirelessly (e.g., inductively). The artisan will appreciate that not all shades 500 need to be powered the same way. For example, the shades 500 in the cockpit may be powered via secure means (e.g., using battery systems that include redundant fail-safe mechanisms) whereas one or more of the intelligent shades 500 in the main aircraft cabin may be powered in other ways.

In an embodiment, the intelligent shade 500 and/or the intelligent shade system 600 may be used to harvest energy. For instance, in an embodiment, the intelligent shade 500 (e.g., the outermost layer 502 thereof) may include solar cells which may convert sunlight impinging on the associated window 400 into electrical current. Or, for example, a photovoltaic substance (e.g., a photovoltaic adhesive), or other energy harvesting substance (e.g., a substance embedded or otherwise attached to piezo elements and/or Peltier devices), may be disposed between the one or more layers of the intelligent shade such that the sunlight (or other energy stimulus such as temperature differential or movement of the substance) on the intelligent shade 500 is transduced into electrical energy. The electrical energy so produced may be used to power the intelligent shade system 600, to power another subsystem in the aircraft, and/or may be stored (e.g., in a battery) for subsequent use.

FIG. 5 shows an alternate embodiment of the shade 500. Here, the shade 500 may serve, among other things, as a virtual blind. Specifically, the shade 500 may include one or more segments (e.g., segments 502A-502E). Any number of segments may be provided on the intelligent shade 500 in this fashion, and the size of one segment (e.g., segment 502A) may but need not be the same as the size of another segment (e.g., segment 502E). While FIG. 5 shows that the segments 502A-502E extend generally horizontally, embodiments where the segments (e.g., segments 502A-502E) extend in other directions (e.g., vertically) are also contemplated.

Each segment 502A-502E may, in embodiments, be individually controllable. For example, a passenger may place his index (or another) finger on the segment 502A and swipe the finger in an upward (or rightward) direction, which may cause the segment 502A to become opaque (or relatively opaque) without affecting the other segments 502B-502E. Similarly, the passenger may place his index finger on the segment 502A and swipe in a downward (or leftward) direction, which may cause the segment 502A to become transparent without affecting the other segments 502B-502E. The passenger may control the other segments 502B-502E independently in the same way (e.g., the passenger may cause segments 502A and 502C to become transparent, and the segments 502B and 502D-E to become opaque).

In some embodiments, all aircraft windows 400 may have an intelligent shade 500 associated therewith. In other embodiments, only certain windows 400 (e.g., windows 400 in the business class) may be retrofitted with the intelligent shade and the passengers may be charged a fee therefor.

Moving on, in embodiments, one or more substances (e.g., damping adhesive) may be disposed between the first layer 302 and the second layer 304 (and/or the third layer 306), as detailed in U.S. patent application Ser. Nos. 15/365,923 and 15/678,392, the disclosures of which are incorporated herein by reference in their entireties. As discussed briefly above, the '923 and '392 Applications disclose a damping adhesive having particles dispersed therein which act to disperse impact forces which may be received by the window 400, which may prevent the display 300 (including display 500) from breaking in the event of a substantial impact.

It is further contemplated that one or more apparatus for dispersing impact forces may be disposed between one or more of the layers 302, 304, and 306 (or 502, 504, and 506). Such apparatus are disclosed in U.S. patent application Ser. Nos. 13/796,170; 14/188,303; 14/310,899; 14/528,099; 14/807,331; and 15/352,419. Each of these applications is incorporated by reference herein in its entirety.

Additionally, in an embodiment, the display 300 may be used to harvest energy. For instance, in an embodiment, the display 300 (e.g., the outer most layer 306 thereof) may include solar cells which may convert sunlight impinging on the third layer 306 into electrical current. Or, for example, a photovoltaic substance (e.g., a photovoltaic adhesive or a carrier having 3 dimensional nanoparticles) may be disposed between the one or more layers of the intelligent display 300 such that the sunlight on the intelligent display 300 is converted into electrical energy. The electrical energy so produced may be used to power the intelligent display 300, to power other systems, and/or may be stored (e.g., in a battery) for subsequent use. In some embodiments, the display 300 may be powered using conventional means (e.g., a standard 110V/220V outlet, batteries, other portable power sources, etc.). The display 300 may also be capable of being powered using different power sources (e.g., the display 300 may, in embodiments, be powered using solar cells during the day and via a standard 110V/220V outlet at night).

In embodiments, users may be allowed to store their various preferences for the display 300, and the display 300 may be configured to automatically adjust its operation based on the identification of a viewer proximate the display 300. For example, in embodiments, the biometric sensors on or proximate the first layer 302 may be used to identify the iris of a viewer proximate the display 300 and cause the display 300 to display particular content (e.g., sports channels, movies, documentaries, advertisements, etc.) based on the viewer's preferences. Alternately, the display 300 may identify a user proximate the display 300 by communicating (e.g., over Wi-Fi, Bluetooth, or another wired or wireless network) with a mobile device (e.g., a smart phone) of the user. In these embodiments, the display 300 memory may include (e.g., the display 300 may obtain during a setup process) a unique identification number associated with the mobile device (e.g., an Android ID, an Apple ID, etc.), and then identify the user by communicating with the mobile device when the mobile device is proximate the display 300. In embodiments, a hierarchy of the various viewers may be stored in memory associated with the display 300. For instance, where the display 300 is in a residential setting and a parent and a child are in a room in which the display 300 is situated, the display 300 may automatically display content preferred by the parent as opposed to the child (or vice versa).

The sensors on or embedded in the first layer 302 and/or the other layers 304, 306 may, in embodiments, include still cameras, video cameras, barcode readers (e.g., laser readers, CCD readers, or other barcode readers), etc., configured to identify items and/or obtain information about items placed proximate the display 300. For example, the display 300 may be situated at an airport and may be used to scan the passports of travelers held up to the display 300; or, for instance, the display 300 may be provided at a retail store (or other store, e.g., at a checkout counter thereof), and may be used to scan the barcodes of items being purchased by the customers. Once the scanning operation is complete, information (e.g., information about the passport holder, information about the item with which the barcode is associated, etc.) gleaned thereby may be displayed on the display 300 (e.g., on the first layer 302 thereof) or elsewhere.

In embodiments, the display 300 may be used in smart phones, glasses, watches, laptops, tablets, and other such portable electronic devices. For instance, the touch screen display of a smart phone may be replaced in whole or in part with the display 300; in these embodiments, a user may be able to selectively view through the smart phone (or through portions of the smart phone) in the transparent mode, and view and interact with content displayed on the smart phone in the display mode and/or the multilayer display mode.

For example, the display 300 may form a screen protector for an electronic device. Here, the layers 302, 304, and 306 may be substantially adjacent one another and adhered together (e.g., using the adhesive disclosed in U.S. patent application Ser. Nos. 15/365,923 and 15/678,392, which are incorporated by reference herein in their entireties) to form the screen protector. Here, the display 300 may have all of the functionalities described herein with reference to the other embodiments. Sensors, which may be embedded in the adhesive or otherwise provided in, on, or around the layers 302, 304, and/or 306 may allow the user to control the screen protector display according to the methods described herein.

In a further completed embodiment, the display 300 includes layers 302, 304, and 306 assembled in a multilayer laminate film. Optionally, an additional layer may include an adhesive (e.g., the adhesive disclosed in U.S. patent application Ser. Nos. 15/365,923 and 15/678,392) which may allow the film to be applied to any surface.

Where multiple displays 300 are provided in an environment (e.g., a display 300 which takes the place of one or more windows in several rooms, a display 300 in one or more receptacles such as a cabinet, a display 300 in the refrigerator door), the displays 300 may be in communication to provide a cohesive experience for the user. Each display 300 may incorporate one or more sensors (such as those described herein) which may identify that a user is in (or not in) the room and/or vicinity of the respective display 300. When the sensor determines that the user is in the room, the display 300 may be activated. When the sensor determines that the user is not in the room, the display 300 may be turned off. In one embodiment, as a user moves from one room to another, a first display (e.g., a display 300 in a window in the living room) may communicate with a second display (e.g., a display 300 in a cabinet in the kitchen) to display the same image(s) that the user was previously viewing. For example, the user may be watching a TV show in the living room, and then may move into the kitchen to prepare food. The respective displays may thus automatically turn on and tune to the correct channel so that the user does not have to re-program the image being displayed as he or she moves from one room to another.

Thus, as has been described, the intelligent display 300 may have many different applications, and may replace the traditional televisions, computer monitors, and other displays in use today. Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations.

The invention claimed is:

1. A method of altering a field of view, the method comprising the steps:
   providing a viewing portal having sequentially: (a) a display panel configured to present images, and (b) an electrically-actuated portion having a transparent state and an opaque state, with the display panel positioned relatively near an intended viewing area and the electrically-actuated portion positioned relatively away from the intended viewing area;
   allowing a controller to select between a fully transparent mode, a black-out mode, and a display mode;
   at the full transparent mode, causing the electrically-actuated portion to be at the transparent state and the display panel to not present images;
   at the black-out mode, causing the electrically-actuated portion to be at the opaque state and the display panel to not present images; and
   at the display mode, causing the electrically-actuated portion to be at the opaque state and the display panel to present images such that, from the viewing area, the presented images are visible and a field of view through the viewing portal is not visible.

2. The method of claim 1, wherein the controller is in communication with a user input for selecting between the fully transparent mode, the black-out made, and the display mode.

3. The method of claim 1, further comprising the steps:
   allowing the controller to select an image-supplementing mode; and
   at the image-supplementing mode, causing the electrically-actuated portion to be at the transparent state and the display panel to present images.

4. The method of claim 1, wherein the images presented at the display mode are moving images.

5. The method of claim 1, further comprising the step of coupling the display panel to a content provider, and wherein the images presented at the display mode are images provided by the content provider.

6. The method of claim 1, wherein the electrically-actuated portion is a suspended particle smart glass panel.

7. The method of claim 1, wherein the step of providing the viewing portal includes providing the viewing portal as a window in a residential or office building.

8. The method of claim 1, wherein the step of providing the viewing portal includes providing the viewing portal as an aircraft window.

\* \* \* \* \*